United States Patent
Hiroki et al.

(10) Patent No.: US 7,398,692 B2
(45) Date of Patent: Jul. 15, 2008

(54) SEALING RING AND ITS MANAGING SYSTEM

(75) Inventors: Tsutomu Hiroki, Nirasaki (JP); Masayuki Noguchi, Gojo (JP); Shinya Sakurai, Gojo (JP)

(73) Assignees: Tokyo Electron Limited, Tokyo (JP); Nippon Valqua Industries, Ltd., Tokyo (JP)

( * ) Notice: Subject to any disclaimer, the term of this patent is extended or adjusted under 35 U.S.C. 154(b) by 318 days.

(21) Appl. No.: 10/570,109

(22) PCT Filed: Sep. 24, 2004

(86) PCT No.: PCT/JP2004/014432

§ 371 (c)(1),
(2), (4) Date: Mar. 1, 2006

(87) PCT Pub. No.: WO2005/031195

PCT Pub. Date: Apr. 7, 2005

(65) Prior Publication Data

US 2007/0012117 A1      Jan. 18, 2007

(30) Foreign Application Priority Data

Sep. 29, 2003   (JP) .............................. 2003-338541

(51) Int. Cl.
    *G01L 7/00*  (2006.01)
(52) U.S. Cl. ........................................ 73/706; 285/113
(58) Field of Classification Search ................... 73/700, 73/706; 285/113
    See application file for complete search history.

(56) References Cited

U.S. PATENT DOCUMENTS 4,030,872 A * 6/1977 Parmann ..................... 425/393
4,120,521 A * 10/1978 Parmann ..................... 285/113

FOREIGN PATENT DOCUMENTS

| JP | 7-124266 A | 5/1995 |
|---|---|---|
| JP | 9-105466 A | 4/1997 |
| JP | 2000-304620 A | 11/2000 |
| JP | 2002-168348 A | 6/2002 |
| JP | 2002-310333 A | 10/2002 |
| JP | 2003-95280 A | 4/2003 |

* cited by examiner

*Primary Examiner*—Andre J Allen (57) ABSTRACT

An object of the present invention is to make it possible to accurately and simply manage the performance deterioration and life duration of sealing rings and other various information about each sealing ring. As a means of achieving this object, a sealing ring according to the present invention is a sealing ring 30 to be fitted to a face-to-face part of members 12, 14 to thus seal a space between both members, comprising: a main body part 32 that is ring-shaped and is capable of becoming elastically deformed; and a circuit chip 40 that is attached unitedly to the main body part 32 and has an information-transmitting means 42 for transmitting the information with the outside of the sealing ring 30.

19 Claims, 4 Drawing Sheets

SEALING RING AND ITS MANAGING SYSTEM

This is the U.S. national phase of International Application No. PCT/JP2004/014432, filed Sep. 24, 2004, which claims priority from Japanese Patent Application No. 2003-338541 filed Sep. 29, 2003.

TECHNICAL FIELD

The present invention relates to a sealing ring. Specifically, the present invention relates to: a sealing ring which is to be fitted to a face-to-face part of members to thus serve to seal a space between both members in such as vacuum devices and piping instruments required to have high air tightness; and a managing system for such a sealing ring.

BACKGROUND ART

As a typical sealing ring, an O-ring is known. The O-ring is molded in a ring shape with an elastic material such as rubber, and its section is O-shaped. Depending on a required performance and a use, various sealing rings having sectional shapes different from that of the O-ring are also proposed.

The sealing ring typified by the O-ring is used in places where a sealing function such as air tightness or water tightness is required in various industrial equipments and devices.

Under general use conditions of the sealing ring, it is inevitable that an elastic material composing the sealing ring changes in material property or deteriorates in physical property with the passage of time. The sealing ring having deteriorated in property is exchanged with a new sealing ring. An exchange timing of the sealing ring varies with use conditions such as a load and an environment when using it. Some sealing rings may be used for several years, and other sealing rings must be exchanged in a short period not more than several months.

For example, a sealing ring to be attached to a valve of a semiconductor-producing device and its opening-and-closing cover is used under severe conditions such that: high air tightness is required, a load applied upon using is large, and further, the sealing ring has a possibility of contacting with a plasma gas or a corrosive gas. Under such use environments, it is necessary to detect deterioration of a performance of the sealing ring surely and quickly or to surely exchange the sealing ring before its performance is deteriorated. If the use of the sealing ring with the deteriorated performance is continued, a quality performance of a semiconductor product is damaged to thus deteriorate the product yield.

Conventionally, in order to judge whether or not the sealing ring needs to be exchanged, it is necessary that a device fitted with the sealing ring is decomposed to expose the sealing ring and observe it, or that the sealing ring is fetched out to inspect it by an inspection apparatus.

Patent document 1 below proposes a technology in which an inner signal member of a color different from the surface of the O-ring is embedded in the inside of the O-ring. This patent document states that: if the surface of the O-ring is deteriorated, then the inner signal member is exposed to the surface, so it is possible to judge the deterioration of the O-ring from the difference in color.

[Patent Document 1] JP-A-168348/2002 (Kokai)

As to conventional methods to judge the exchange of the sealing ring or to manage the sealing ring, it is difficult to appropriately judge the exchange or make strict management about individual sealing rings when they are used.

For example, as to the art described in the above patent document 1, unless the O-ring is fetched out from its fitting part to observe its surface, it is not possible to judge the deterioration of the O-ring from whether the inner signal member is exposed or not. In order to fetch out the O-ring from its fitting part, it is necessary as a matter of course that the working of the device including the fitting part is stopped to decompose a peripheral device including the fitting part of the O-ring. If the O-ring is not deteriorated, the reworking of the device will be performed after fitting the O-ring again and reassembling the device. During this time, a time loss is large and a human burden is also heavy.

A method is also carried out in which: there are beforehand collected the data with relation to a degree of progress in a deterioration of a performance and a life duration about the sealing ring in a specific fitting place, and therefrom the exchange timing of the sealing ring is estimated. However, unless there is any past data such that the load and environmental conditions, acting on the sealing ring, conform completely to those of the present sealing ring, it is difficult to accurately estimate the exchanging timing. The progress of the performance deterioration may be different due to an individual difference between the sealing rings.

It has a limitation to estimate a degree of progress in a deterioration of a performance and a life duration about each of the sealing rings by only the data collected in the past.

On the scene using a conventional sealing ring, the sealing ring is exchanged if there has passed a definite period during which it is, from such as past experiences, considered possible to sufficiently maintain the performance of the sealing rings regardless of a usage environment and an individual difference. However, this results in also exchanging the sealing ring having a sufficient sealing function, so this leads to much waste of money. The number of times of the exchanging of the sealing ring increases more than necessary, so that unfavorably the operation rate of the apparatus to which the sealing ring is attached decreases largely.

In order to record a history (e.g. a production period and a use-start period) and other managing information with respect to each sealing ring and exchange a sealing ring to be exchanged on the basis of this managing information, it is necessary to strictly manage each sealing ring and its managing information while making their one-to-one correspondence. This is very troublesome. It is very troublesome to give an identification number to each sealing ring and record it every time the sealing ring is attached or exchanged on the scene using the sealing ring. As to a sealing ring in use incorporated within the equipment and apparatus, it is difficult to check, from the outside, which identification number this sealing ring has.

DISCLOSURE OF THE INVENTION

OBJECT OF THE INVENTION

An object of the present invention is to male it possible to accurately and simply manage the aforementioned performance deterioration and life duration of sealing rings and other various information about each sealing ring.

SUMMARY OF THE INVENTION

A sealing ring according to the present invention is a sealing ring to be fitted to a face-to-face part of members to thus seal a space between both members, comprising: a main body part that is ring-shaped and is capable of becoming elastically deformed; and a circuit chip that is attached unitedly to the main body part and has an information-transmitting means for transmitting the information with the outside of the sealing ring.

[Sealing Ring]:

The sealing ring has a function to be fitted to a face-to-face part of members to thus seal a space between both members. Its basic materials, structures, and usage modes are common to those of conventional sealing rings.

As modes of fitting the sealing ring, there are the following ones: a mode in which the sealing ring is fitted to a junction portion of members that are used in a fixed state such as a container-shaped processing chamber and its cover in a semiconductor-producing device; and besides, a mode in which the sealing ring is fitted to a portion where a sealed state and a sealing-released state are repeated such as a cover and an opening of an opening and closing cover; and a mode in which the sealing ring is fitted to a portion where members rub or rotate on each other such as a shaft and a hole.

[Main Body Part]:

The main body part is a structure as a main part of the sealing ring and is ring-shaped and is capable of becoming elastically deformed and performs the sealing function. The same materials and structures as those of conventional sealing rings can be used. It is also possible to utilize conventional sealing rings or commercially available sealing rings as they are.

As a typical example of the shape of the main body part, a sectionally circular O-ring can be cited. As to the sectional shape, there can also be adopted a rectangular one, a trapezoidal one, and other ones.

As materials of the main body part, the same elastic materials (e.g. rubber, resins, elastomers) as those of conventional sealing rings may be used. Specifically, such as fluororubber and silicon rubber can be cited. A blend material (combining a plurality of rubber materials) and a polymer alloy material can be also adopted. A composite material in which a metallic or fibrous material is embedded can be also adopted.

The ring shape of the main body part is generally a circular ring shape. However, in accordance with the form of the place where the sealing ring is fitted, an ellipse ring shape, an oval ring shape, and a rectangular ring shape may also be available.

The size of the main body part is different depending on its usage purpose and required performance. In the case of embedding a circuit chip including a pressure sensor or the like, a main body part having a sectional diameter of not less than about 4 mm is used.

[Circuit Chip]:

The circuit chip is a minute piece, that is, a chip, in which an electric and electronic circuit chip having an electric or electronic processing function is incorporated.

On a substrate made of a silicon, a resin, a metal or the like, there is formed a prescribed circuit by using various thin-film-forming means, thick-film-forming means, photolithography technologies or the like. Alternatively, there is also a circuit chip having a structure such that another semiconductor element is mounted on or embedded in a wiring substrate. In addition, a power supply circuit (e.g. battery) for activating the circuit can also be provided. A working power source may be supplied from the outside.

The shape of the circuit chip is different depending on the function or circuit to be incorporated or on the size and shape of the main body part of the sealing ring. Favorable is a shape that can be easily attached to the main body part and spoil the sealing function of the sealing ring. Generally, the circuit chip is a thin plate shape. Alternatively, there are also the following types: a thick-block-shaped type; a bar-shaped type; a type having irregularities on its surface, and a partly perforated type.

The size of the circuit chip is set at a size such that: the circuit chip can be attached to the main body part of the sealing ring, and the sealing function of the sealing ring is not spoiled. For example, in the case of the circuit chip including a pressure sensor or the like, it is preferable to set the size of the circuit chip at an outer diameter size of not more than 60% relative to the sectional diameter of the main body part.

<Attaching to Main Body Part>:

The circuit chip is attached unitedly to the main body part of the sealing ring.

The attaching structure and the attaching means are different depending on the objective function of the circuit chip and its structure or on the function of the sealing ring.

The circuit chip may be eternally attached and fixed to the main body part of the sealing ring, or it may be detachably attached thereto.

The circuit chip can be embedded within the main body part of the sealing ring. If the circuit chip is completely embedded within the main body part, then the appearance of this sealing ring is identical with conventional sealing rings without the circuit chip. A portion of the circuit chip may protrude or stick out of the main body part. In the case where a member that needs to be disposed outside the sealing ring (e.g. wiring or an antenna as an information-transmitting means) is connected to the circuit chip, this member is disposed so as to be exposed to outside the main body part.

In order to attach the circuit chip to the main body part into a state embedded therein, the circuit chip can be incorporated by forming a notch or hole in the main body part wherein the notch or hole goes through from the outer periphery of the main body part to its inside. Furthermore, it is also possible to bond the circuit chip into the notch or hole by an adhesive. It is also possible that, when molding and producing the main body part, the circuit chip is united therewith by molding the main body part in a state where the circuit chip is embedded in a mold.

It is also possible that the circuit chip is attached unitedly to the outer surface of the main body part. Specifically, the adhesive can bond the circuit chip to the main body part. It is also possible to use an adhesive tape, a pin fitting or the like to fix the circuit chip to the main body part.

It is also possible that: the circuit chip is attached to another member (e.g. a capsule, a pin, a sheet piece) in advance by incorporating the circuit chip in this member or fixing the circuit chip to this member, and then this member to which the circuit chip has been attached is attached to the main body part of the sealing ring. Thereby, a minute circuit chip can be easily attached. During the attaching operation, it is possible to prevent the circuit chip from being damaged or being lost and it is possible to accurately set the attaching position or posture of the circuit chip.

The attaching position of the circuit chip in the sealing ring is desirably a position where no bad influence is exercised on the sealing function. For example, no circuit chip is made to exist in a place where a contact surface pressure is generated when the circuit chip contacts with the both-side members to be sealed by the sealing ring. In the case where the sealing ring is used for sealing a space becoming a high vacuum environment, a plasma generation environment, a specific gas environment, or a high temperature environment off from the external world with a normal atmospheric pressure, if the circuit chip is attached to a range, facing the external world, of the sealing ring, then the sealing function is not spoiled, and the circuit chip is not exposed to the above-described severe environment. It is preferable that the notch or hole for attaching the circuit chip is also provided in the side facing the external world similarly to the above. If the circuit chip is embedded in the main body part of the sealing ring so as not to be exposed to the surface of the sealing ring, then the circuit chip can be blocked off from the external severe environment.

Either only one or more circuit chips can be provided to the sealing ring. For example, if the circuit chips having a sensor function are disposed in a plurality of places in a peripheral direction of the sealing ring, then it is possible to accurately know the state on the entire periphery of the sealing ring by detecting various state quantities having a possibility of dispersion in the peripheral direction of the sealing ring. Alternatively, it is also possible to dispose a plurality of circuit chips having different sensor functions, or a circuit chip having a sensor function and a circuit chip having an information storage function, in the same position or different positions in the same sealing ring.

[Sensor Part]:

A sensor part can be provided to the circuit chip.

The sensor part has a sensor function to detect a physical or chemical state quantity. The state quantity is sufficient if the circuit chip can detect it and if it needs to be detected under the usage environment of the sealing ring. As the state quantity, there are various physical or chemical state quantities. For example, there is a pressure sensor for detecting a pressure, and also there is a temperature sensor for detecting a temperature. Also, there can be cited a distortion sensor, a gas sensor, a vacuum sensor, a temperature sensor and the like. As the pressure sensor, there are a distortion gauge type pressure sensor, a capacitance type pressure sensor, and a piezo resistance element type pressure sensor and the like. As the temperature sensor, there are a contact type thermocouple and the like.

Depending on the function of the sensor, the structure and circuit constitution of the sensor part are different. The sensor part may be composed only of a sensor element or it may include the sensor element, a control circuit of the sensor element, a signal-processing circuit and the like. Depending on the state quantity to be detected by the sensor, the entire structure of the circuit chip and its attaching structure to the sealing ring are different.

For example, as to the pressure sensor for detecting a pressure to be applied to the sealing ring or an inner stress of the main body part in use condition to carry out the sealing function, the sensor part is disposed in a place where it can easily detect the pressure to be applied to the sealing ring or the inner stress. Specifically, it is possible to embed the sensor part within the main body part of the sealing ring between surfaces of contact of the sealing ring with both members to be sealed by the sealing ring.

For the circuit chip provided with the sensor part, an MEMS (Micro Electro Mechanical System) technology can be utilized. In the MEMS technology, it is possible to incorporate the sensor part and a processing circuit of the detection information into the circuit chip. Alternatively, it is possible to incorporate a mechanical operation structure into the sensor part. In the case of the pressure sensor, a diaphragm structure can be made therein.

[Information Storage Part]:

The circuit chip can be provided with an information storage part for storing the managing information about the sealing ring.

A memory circuit or a memory element can compose the information storage part. The memory may be a ROM memory such as a nonvolatile memory, or a writable or rewritable memory is also available. The memory capacity can be set in accordance with the information quantity to be stored in the information storage part.

In the circuit chip, an electronic circuit for writing or rewriting the information in the information storage part can be incorporated. It is also possible to constitute the circuit so that the detection information detected by the aforementioned sensor part can be written in the information storage part. Furthermore, it is also possible to store the instruction information for controlling the operation of the sensor part.

As the circuit chip having the information storage part, a non-contact IC chip can be used. Specifically, an RFID (radio frequency identification) chip can be used. The RFID chip has a memory for storing the information therein, and it can read the storage information from the memory in non-contact by means of an induction electromagnetic wave or the like to be supplied from an external reading apparatus. An antenna circuit for a radio frequency is incorporated in the RFID chip. The RFID chip is a radio system which does not need wiring as the information-transmitting means, and the RFID chip does not need a working power source, either.

<Managing Information>:

As the managing information to be stored in the information storage part, there is adopted the information useful to favorably exercise the performance and function of the sealing ring or to make the handling of the sealing ring easy. Thus, the specific content of the information is not limited.

Combining a numeral, a character, a mark and the like can constitute the managing information.

As a specific example of the managing information, a production number can be cited. The production number specify each sealing ring. There is a lot number assigned to a group of sealing rings produced in the same operation process or in the same period of time during the production. There is also a mark representing the production factory, and there is also the information about the production period of time to specify the year, month, day, and time when the sealing ring was produced, and there is also the model number of the sealing ring, and there is also a mark representing the material of the sealing ring. These pieces of information are decided during the production of the sealing ring and therefore can be stored in the information storage part during or just after the production of the sealing ring.

Some information may be decided or changed after the production of the sealing ring. For example, there is information about a market channel, a market destination, transport, and storage of the sealing ring, and there is information about a use-start period of the sealing ring, and there is information about a use place of the sealing ring and about apparatus to which the sealing ring is attached. In cases of these pieces of information, when having been decided or changed, they can be written or rewritten in the information storage part.

During the use of the sealing ring, some pieces of information are decided or changed. For example, there are such as a history of a pressure and a temperature to act on the sealing ring, a history of the inner stress generated in the sealing ring, and environmental conditions.

It is also possible that: the managing information to be stored in the information storage part is limited to only the individual identification number of the sealing ring, and the other managing information is recorded in an information-processing apparatus or a database for management together with the identification number. In this case, the information storage capacity of the circuit chip of the sealing ring is saved to a small one, and this is effective for making the circuit chip minute.

[Information-Processing Apparatus]:

This apparatus serves to transmit and receive the information with the circuit chip to electronically process the information.

Information-processing apparatus such as conventional computers can be adopted. A controller, a measuring device, and a data-processing apparatus, corresponding to the sensor part incorporated in the circuit chip, can be also adopted.

The information-processing apparatus can store the information about the sealing ring. The information-processing apparatus can store not only the same information as stored in the information storage part of the circuit chip but also other information. It is also possible that: the stored information is accumulated in an external storage apparatus with the passage of time or recorded on an external recording medium. It is also possible that: the information-processing apparatus exchanges the information about the sealing ring with the database.

The information-processing apparatus can be provided with an informing means for prompting an exchange of the sealing ring or giving warning of a malfunction of the sealing ring or of the apparatus to which the sealing ring is attached. The informing means includes such as a warning light, a warning buzzer, and a display. It is also possible to display the managing information about each sealing ring on a display of the information-processing apparatus or to display a list of the managing information about a plurality of sealing rings.

The information-processing apparatus can be made to have a function to write or rewrite the information in the circuit chip. For example, a processing circuit to write or rewrite the information in a memory constituting the information storage part of the circuit chip can be provided to the information-processing apparatus.

The information-processing apparatus may be incorporated in the apparatus equipment used with the sealing ring fitted thereto, or the information-processing apparatus may be set separately from the apparatus equipment to which the sealing ring is fitted. If necessary, a transportable information-processing apparatus may be transported to a place where the sealing ring is fitted.

The information-processing apparatus can be connected so that the information-processing apparatus can exchange the information with the control system for managing and controlling the entire apparatus to which the sealing ring is fitted. It is possible that the information about such as the state of the sealing ring and the degree of deterioration of performance is utilized for the managing control of the entire apparatus to which the sealing ring is fitted.

[Information-Transmitting Means]:

If necessary information transmission can be carried out between the circuit chip of the sealing ring and the outside of the sealing ring, then various information-transmitting means that are utilized for information transmission between conventional instrumental devices can be used.

Generally, the information transmission by means of electric wiring can be adopted. An optical communication line can also be utilized. Information-transmitting means by means of radio without using the wiring can also be adopted.

In order to perform the information transmission by radio bi-directionally, it is enough that a radio transmission and reception circuit is provided not only in the circuit chip but also in the information-processing apparatus. If the information transmission is sufficient in only one direction, then even it is enough to merely provide a transmission circuit to either one of them and a reception circuit to the other. For example, if the sensor information detected by the circuit chip is merely transmitted to the information-processing apparatus, then the transmission circuit is provided to the circuit chip, and the reception circuit is provided to the information-processing apparatus. As the information-transmitting means not needing the wiring, it is possible to utilize radio electromagnetic waves, and besides, such as infrared rays and supersonic waves.

The information-transmitting means may be combined with a power-source-supplying means for supplying the working power source to the circuit chip.

[Judgment of State of Sealing Ring]:

On the basis of the information from the sensor part and the information storage part belonging to the circuit chip, it is possible to judge the life duration or exchange timing of the sealing ring. Also, it is possible to judge to what degree the deterioration of performance of the sealing ring has proceeded, and further it is possible to know that a malfunction has occurred to the sealing ring.

Specifically, when the state quantity detected by the sensor part has gone beyond or below the prescribed limit value, it can be judged that the life duration of the sealing ring has come to the end. The prescribed limit value can be determined from experimental or empirical data in advance. When the state quantity has rapidly changed or when the changing rate of the state quantity has become excessive, it can also be judged that the life duration has come to the end.

For example, if, when the pressure generated within the main body part, that is, the inner pressure or stress, is detected by the sensor part, the decrease of the inner stress after the passage of time relative to the inner stress at the start of the use, namely, the inner stress alleviation ratio, has exceeded the prescribed limit value, then it can be judged to be time to exchange the sealing ring. If how long the sealing ring can be used from now is judged from the value of the inner stress alleviation ratio detected by the sensor part, then the future exchange timing can be also estimated. If a gas leakage or temperature change caused by deterioration of the sealing function is detected by the sensor part, then the deterioration of performance of the sealing ring can be also known.

If, like the semiconductor-producing device, the use environment is such that the state quantity (e.g. temperature, pressure applied from the processing chamber to a place where the sealing ring is attached) largely changes between when the apparatus is activated and when the apparatus is not activated, then the number of times of the activation can be known by detecting the number of times of the change in pressure or temperature by the sensor part. When the number of times of the activation has exceeded a definite number of times, it can be judged that the life duration of the sealing ring has come to the end. In the same way, if the usage is such that the stress is repeatedly generated in the sealing ring, then it is possible to judge the life duration from the number of repeats of the pressure change. If, when the number of times of the opening and closing of an opening-and-closing valve is detected from the change of the pressure or stress, the number of times of the opening and closing has exceeded a definite number of times, then it is also possible to judge that the life duration of the sealing ring has come to the end.

When the cumulative values of the state values (e.g. temperature or stress) detected by the sensor part have exceeded their respective prescribed limits, the sealing ring may be exchanged. In this case, it can be perceived that such as material deterioration of the sealing ring and its stress alleviation proceed due to the accumulation of the state values (e.g. temperature or stress). Therefore, the life duration of the sealing ring is estimated from the cumulative values of these state values. In this case, it is enough that the correlations of the deterioration of the performance of the sealing ring with the cumulative values of the aforementioned state values are determined from experimental or empirical values in advance.

It is also possible to judge the deterioration of performance of the sealing ring comprehensively from a plurality of state quantities detected by the sensor part. For example, if the temperature environment is a high-temperature and severe one even though the decrease of the inner pressure of the sealing ring or its inner stress alleviation ratio is the same, then it can be perceived that the performance rapidly deteriorates to thus come to the end of the life duration. Thus, if the inner stress alleviation ratio is corrected according to temperature conditions, then it is possible to judge the life duration more accurately and further to correct the inner stress alleviation ratio according to environmental conditions other than the temperature.

It is also possible to judge the life duration of the sealing ring on the basis of the information stored in the information storage part. For example, it is judged that the exchange timing has come if the passage period of from the production period or use-start period (stored in the information storage part) up to now has exceeded a prescribed period of time. It is also possible that: a stored product of the same lot number as of the sealing ring is separately tested for durability and, from its result, the exchange timing of the sealing ring of the same lot number is decided.

It is also possible to judge the life duration of the sealing ring by comprehensively judging the detection information of the sensor part and the storage information of the information storage part. For example, it is possible that the value of the aforementioned stress alleviation ratio is corrected on the basis of the time having passed from the use-start time. Even if the stress alleviation ratio is small, there is a possibility that the performance is deteriorated as to the sealing ring having been used for a long period of time from the use-start. Therefore, it is possible to exchange the sealing ring early at a stage a little before the stress alleviation ratio becomes the prescribed limit value. In addition, in the case where the stress alleviation ratio has rapidly changed though the period of time from the use-start is short, then, judging that a malfunction has occurred to the sealing ring, the sealing ring can be exchanged.

It is possible to correct the limit value of the aforementioned stress alleviation ratio, or to correct the intervals of the exchange timing, on the basis of differences between usage places as to conditions (e.g. degree of environmental severity, degree of demand for reliability upon the sealing ring) known from the information about the places where the sealing ring is used as the storage information in the information storage part.

The above-described judgment or estimation of the life duration or exchange timing of the sealing ring can be determined by performing arithmetic processing with software that is incorporated in a computer constituting the information-processing device. The life duration of the sealing ring may be judged by accumulating the past empirical value or data and then comparing those data with various state quantities that are detected by the sensor part in an actual sealing ring.

[Sealing-Ring-Managing System]:

A system for managing the information about the sealing ring, including the aforementioned judgment of the state of the sealing ring, can be constituted.

The sealing-ring-managing system includes the sealing ring, the information-processing apparatus, and the information-transmitting means for transmitting the information between the circuit chip of the sealing ring and the information-processing apparatus.

The sealing-ring-managing system continuously manages the sealing ring in a state the sealing ring is fitted to the face-to-face part of the members. The information is inputted from the circuit chip of the sealing ring into the information-processing apparatus. The input information may include: the state quantity detected by the aforementioned sensor part; and the managing information stored in the aforementioned information storage part. The software or processing circuit, having been programmed in advance, carries out the information processing in the information-processing apparatus. The information that is processed in the information-processing apparatus and then outputted therefrom can include the information on the sealing ring such as life duration, exchange timing, degree of deterioration of performance, and whether or not there is any occurrence of malfunction. The output information can be outputted from the information-processing apparatus to another information display, another warning device, another information-processing apparatus or the like. It is also possible that the output information is written in the information storage part of the sealing ring.

EFFECTS OF THE INVENTION

As to the sealing ring according to the present invention, it is possible to accurately know or judge such as the performance property, life duration, and exchange timing about each sealing ring (which is used in the fitted place) by the information transmission between the circuit chip (attached unitedly to the main body part) and the outside of the sealing ring.

Particularly, if the circuit chip has the sensor part, then the physical or chemical state quantity of the sealing ring that is actually used can be detected, and the usage environment conditions of the sealing ring and its progress conditions in performance deterioration can be accurately known, so that it is possible to accurately judge the life duration of the sealing ring and its exchange timing.

In addition, if the circuit chip has the information storage part, then the histories (different between individual sealing rings) of from production till during use of the sealing rings, the properties of the sealing rings, and other information necessary for managing the sealing rings can be obtained from every individual sealing ring during its use, so that it becomes possible to accurately and easily manage the sealing rings.

BRIEF DESCRIPTION OF THE DRAWINGS

FIG. 3 (a) is a sectional view illustrating a main part of the O-ring, and FIG. 3 (b) is a plan view illustrating this main part.

FIG. 5 (a) is a sectional view illustrating an operation of attaching a circuit chip, and FIG. 5 (b) is a plan view illustrating this operation.

EXPLANATION OF THE SYMBOLS

10: Semiconductor-producing apparatus
12: Processing chamber
13: Accommodating groove
14: Cover body
30: O-ring
32: Main body part
40: Circuit chip
42: Wiring
43: Information-processing apparatus
50: Cutting-in tool

DETAILED DESCRIPTION OF THE INVENTION

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

Figure 1:
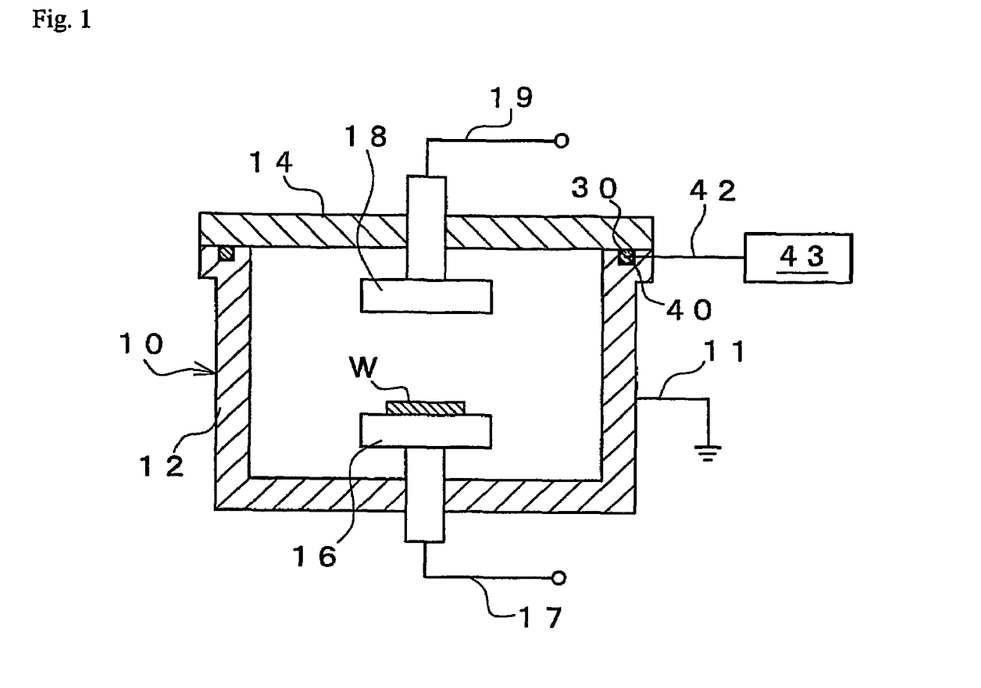
FIG. 1 is a sectional view of a semiconductor-producing apparatus which is fitted with an O-ring that illustrates a mode for carrying out the present invention.

[Use Mode of O-Ring]:

The mode for carrying out the present invention, as illustrated in FIG. 1, shows a state where an O-ring 30, which is a sealing ring, is used in a semiconductor-producing apparatus 10.

In the semiconductor-producing apparatus 10, a cover body 14 that is freely openable and closeable is attached on a top surface of a container-shaped processing chamber 12. In the processing chamber 12 and under the cover body 14, electrodes 16 and 18 are disposed respectively. To the electrodes 16 and 18, wirings 17 and 19 leading to a power source are connected respectively. To the processing chamber 12, a ground wire 11 is connected. It is possible to apply a high frequency voltage or the like between the electrodes 16 and 18. The processing chamber 12 is further provided with a vacuum exhaust pipe, a processing gas supply pipe and the like (though not illustrated in the drawing figure).

A material W to be processed, such as a semiconductor wafer, is disposed on the lower electrode 16, and then a voltage is applied between the electrodes 16 and 18. Thereby, plasma can be generated within the container body 12 to thus apply the plasma processing (e.g. plasma etching, plasma CVD) to the material W to be processed.

The O-ring 30 of a ring shape with a circular section is fitted to a place where an opening peripheral rim of the processing chamber 12 and the lower surface of the cover body 14 face each other, so that the airtight sealing is achieved in the face-to-face place. The O-ring 30 can prevent the vacuum state within the processing chamber 12 from being spoiled by intrusion of air from the outside and prevent the processing gas and the plasma gas within the processing chamber 12 from leaking to the outside.

Figure 2:
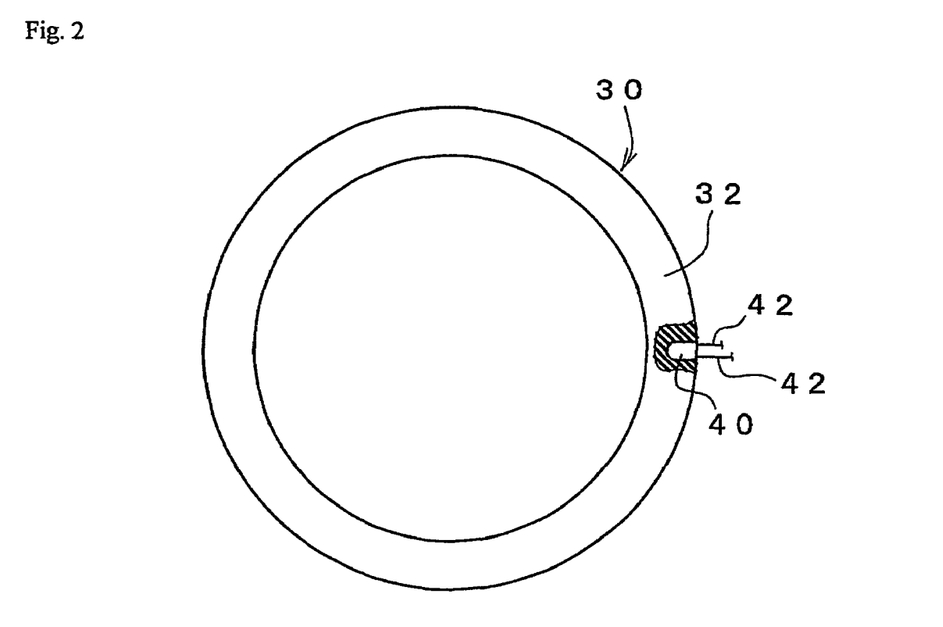
FIG. 2 is a plan view of the O-ring partly notched.

[O-Ring]:

As shown in FIG. 2, a circuit chip 40 is embedded in a portion of the O-ring 30. As the material of a main body part 32 of the O-ring 30, there is used a material (e.g. fluororubber) having a good elasticity and having a durability against a high heat, a corrosive gas, a plasma gas and the like that are generated in the processing chamber 12. The circuit chip 40 is a minute part, which comprises a semiconductor element, an IC circuit or the like and performs an electric or electronic circuit function.

In this mode for carrying out the present invention, a pressure sensor is used as the circuit chip 40. A wiring 42 connected to the circuit chip 40 is pulled out of the main body part 32. The information detected by the pressure sensor of the circuit chip 40 is transmitted from the wiring 42 to the outside.

As shown in FIG. 1, the wiring 42 is connected to an information-processing apparatus 43 that is set outside the semiconductor-producing apparatus 10. The information-processing apparatus 43 comprises a computer or the like. The information-processing apparatus 43 and the circuit chip 40 of the O-ring 30 are capable of transmitting and receiving therebetween the information via the wiring 42.

Figure 3:
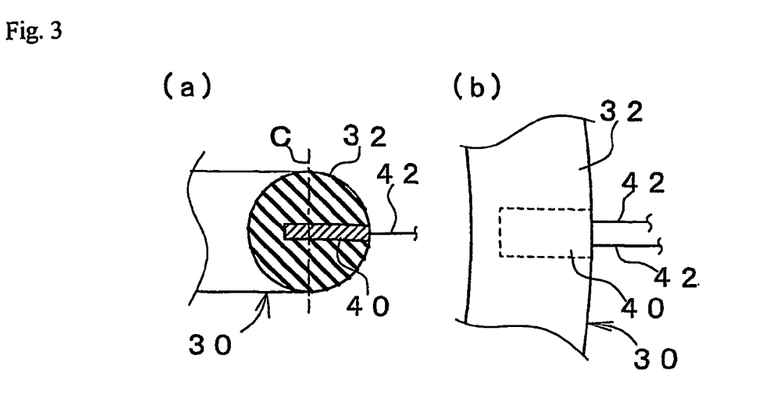

FIG. 3 shows the detailed structure of the O-ring 30. As shown in FIG. 3(*a*), the circuit chip 40 of a thin plate shape is embedded in the main body part 32 (with the circular section) from its outer periphery side along a diameter in a horizontal direction. A tip end of the circuit chip 40 reaches the inner periphery side that is more inside than a central line C along a vertical direction in the circular section of the O-ring 30.

Figure 4:
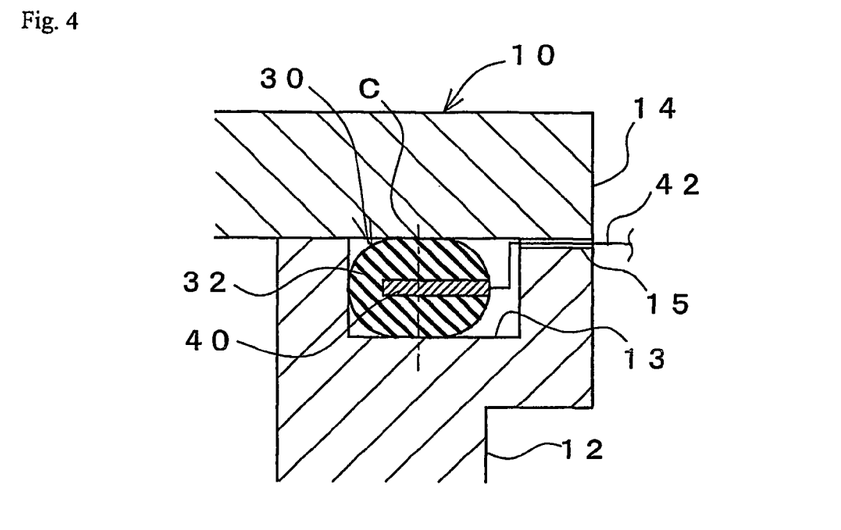
FIG. 4 is an enlarged sectional view of a fitted state.

[Fitted State of the O-Ring]:

FIG. 4 shows a fitted state of the O-ring 30 in detail. The O-ring 30 is accommodated in a accommodating groove 13 that is formed in the opening peripheral rim of the processing chamber 12 of the semiconductor-producing apparatus 10. The wiring 42 pulled out of the outer periphery side of the O-ring 30 is elongated along a wiring groove 15 formed from the accommodating groove 13 to the outer peripheral end in the opening peripheral rim of the processing chamber 12, and then the wiring 42 is pulled out of the processing chamber 12.

If the cover body 14 is put on the top surface of the processing chamber 12 and then fastened and fixed to the processing chamber 12 by bolt fastening or the like, then the section of the O-ring 30 that was circulate before its fitting is changed into the shape of a flat circle squashed in a vertical direction. Due to a repulsive force generated by elastic deformation of the O-ring 30, the O-ring 30 and the lower surface of the cover body 14 are pressed into contact with each other to generate a contact surface pressure, so that the sealing function expresses itself. The O-ring 30 and the bottom surface of the accommodating groove 13 are also pressed into contact with each other, so that the sealing function due to a contact surface pressure is exercised.

The inner stress or distortion generated in the main body part 32 of the O-ring 30 is detected by the pressure sensor of the circuit chip 40. The pressure applied to the main body part 32 is mainly generated between an area of contact of the main body part 32 with the lower surface of the cover body 14 and an area of contact of the main body part 32 with the bottom surface of the accommodating groove 13. Therefore, it is necessary that there is the pressure sensor of the circuit chip 40 between these upper and lower areas. In addition, the flat surfaces of the circuit chip 40 is oriented so as to cross at right angles to the direction of the pressure applied to the O-ring 30, namely, to the vertical direction. Thereby, it is possible to detect the change of the inner pressure of the O-ring 30 accurately with a high sensitivity.

The information detected by the pressure sensor of the circuit chip 40 is transmitted to the information-processing apparatus 43 via the wiring 42. The information-processing apparatus 43 judges whether or not the output information from the pressure sensor is in a preset permissible range, or accumulates the data of the time-passage change, or gives the alarm if an abnormality has occurred.

In the fitted state shown in FIG. 4, there is a possibility that: a vacuum pressure within the processing chamber 12 may be applied to the inner periphery side of the O-ring 30, so that the processing gas or plasma generated within the processing chamber 12 may contact with the inner periphery side of the O-ring 30. However, there is only the main body part 32 at the inner periphery side of the O-ring 30 similarly to conventional O-rings. Therefore, no trouble is caused with respect to the sealing function of the O-ring 30. In addition, the end portion of the circuit chip 40 or the wiring 42 that are exposed to the outer periphery side of the O-ring 30 is not exposed to a corrosive atmosphere. Even if the wiring groove 15 having accommodated the wiring 42 communicates with the outer world outside the processing chamber 12, no sealing function is spoiled.

[Performance Judgment from Inner Stress of the O-Ring]:

It is possible to know the deterioration of the life duration or sealing function of the O-ring 30 on the basis of the information from the pressure sensor of the circuit chip 40.

The sealing function of the O-ring 30 is fulfilled by the surface pressure of contact of the O-ring 30 with both members existing on opposite sides of the O-ring, for example, the cover body 14 and the bottom surface of the accommodating groove 13. If the contact surface pressure is sufficient, then no leak of the gas or the like occurs. If the contact surface pressure drops, then the gas or the like easily leaks and this results in deterioration of the sealing function.

Usually, at the start of the use of the O-ring 30, a stress is generated within the O-ring 30 by the fastening force, and this leads to the generation of the contact surface pressure to a sufficient degree corresponding to this inner stress. With the passage of time, the alleviation of the stress makes progress within the O-ring 30, and thus the contact surface pressure becomes small, so that the sealing function deteriorates. Then, if the contact surface pressure becomes lower than a prescribed limit value, then it can be judged that the life duration of the O-ring 30 has come to the end. However, it is difficult to directly measure the change of the contact surface pressure without spoiling the sealing function with respect to the O-ring 30 when it is used.

Thus, by detecting the change of the stress caused in the O-ring 30, it is possible to indirectly know the above-described change of the contact surface pressure to thereby predict the performance deterioration and life duration of the O-ring 30.

In order to detect the inner stress of the O-ring 30, it is enough that the circuit chip 40 having the pressure sensor incorporated therein is embedded in the O-ring 30. Corresponding to the inner stress being generated in the O-ring 30, the pressure that is generated within the O-ring 30 and is detected by the pressure sensor makes a change. If a distortion gauge type pressure sensor is, for example, used as the pressure sensor, then the change of the distortion quantity generated within the O-ring 30 can be caught to thereby detect the change of the inner stress.

The distortion of the O-ring 30 corresponding to the contact surface pressure is mainly generated in a direction in which the contact surface pressure is applied. For example, in FIG. 4, the contact surface pressure is applied in a vertical direction, so that the distortion is caused in the vertical direction. Accordingly, in order to know the change of the inner stress by the pressure sensor of the circuit chip 40 embedded in the O-ring 30, it is desirable that the pressure sensor is put in such a position and posture as facilitates the detection of the pressure or distortion in the vertical direction. In FIG. 4, the pressure sensor of the circuit chip 40 embedded in the O-ring 30 in a horizontal direction and placed crossing the vertical center line C of the O-ring 30 detects the vertical pressure to the O-ring 30, so that it is possible to detect the inner stress of the O-ring 30 accurately with a high sensitivity.

Figure 5:
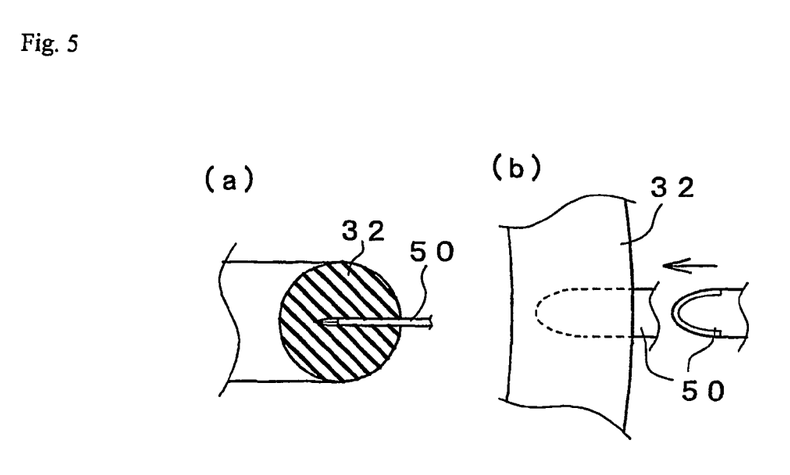

[Attaching of Circuit Chip]:

FIG. 5 explains the operation of attaching the circuit chip 40 to the O-ring 30.

The main body part 32 of the O-ring 30 has the very same material and shape as of conventional O-rings, and commercially available standard O-ring products are used as they are.

A cutting-in tool 50 of a thin plate shape having a cutting-in blade at its front end cuts into the above main body part 32 from the outer periphery side thereof along a diameter in a horizontal direction. The main body part 32 made of a rubber material or the like can be cut in relatively easily. After the front end of the cutting-in tool 50 has cut into a prescribed position, the cutting-in tool 50 is pulled out. The depth of the cutting-in can be set at about ⅔ of the linear diameter of the O-ring 30.

After that, the circuit chip 40 is inserted into the cut formed in the main body part 32. In a state where the circuit chip 40 has been inserted into a prescribed position, the circuit chip 40 is sandwiched in and thus surely fixed by elastic restoration of the cut in the main body part 32. If necessary, the circuit chip 40 and the main body part 32 may be fixed together by use of an adhesive. By bonding the pressure sensor of the circuit chip 40 unitedly to the main body part 32, it becomes possible to accurately detect the inner stress of the main body part 32. In a fitting place that is exposed to a high heat such as in the semiconductor-producing apparatus 10, it is desirable to use a heat-resistant adhesive.

Figure 6:
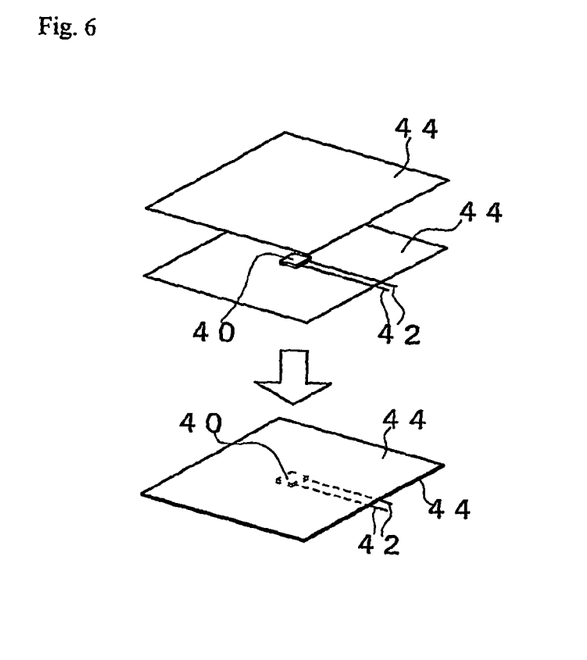
FIG. 6 is a perspective view illustrating a structure of attaching the circuit chip.
Figure 7:
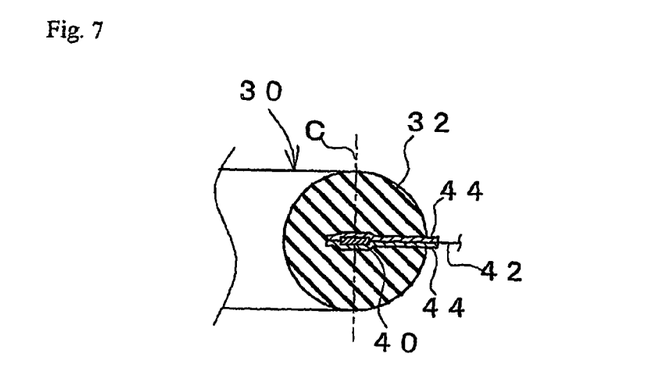
FIG. 7 is a sectional view of an O-ring that employs the attaching structure of the previous drawing figure.

[Other Modes for Carrying Out Present Invention]:

<Sandwiched Structure>:

In the mode shown in FIGS. 6 and 7 for carrying out the present invention, the fitted structure of the circuit chip 40 is different from that of the aforementioned mode for carrying out the present invention.

As shown in FIG. 6, the circuit chip 40 in the shape of a minute rectangular piece is bonded to relatively large square resin sheets 44, 44 in a state sandwiched in therebetween. The resin sheets 44 have rigidity in such a degree as to be able to maintain a horizontal posture in a self-standing state. As materials of the resin sheets 44, an epoxy resin, an imide resin and the like can be used. A portion of the wiring 42 connected to the circuit chip 40 is also sandwiched in between the resin sheets 44. However, the end portion of the wiring 42 is elongated outside the resin sheets 44.

As shown in FIG. 7, the circuit chip 40 in a state sandwiched in between the resin sheets 44 is fitted into the main body part 32 of the O-ring 30 in the same way as of the aforementioned mode for carrying out the present invention. If the same cut as above is made in the main body part 32 and if the resin sheets 44 are thereafter inserted into this cut, then the circuit chip 40 sandwiched in between the resin sheets 44 is smoothly inserted into the depth of the cut.

Incidentally, it is also permitted that: after the circuit chip 40 has been sandwiched in between the square resin sheets 44 in the way shown in FIG. 6, a portion of each of the resin sheets 44 is cut off outside the circuit chip 40 to reduce the resin sheets 44 into the minimum necessary size, and then they are inserted into the cut.

In FIG. 7, a portion of each of the resin sheets 44, 44 protrudes a little out of the outer peripheral surface of the main body part 32. However, no problem occurs to the sealing function of the O-ring 30.

In the above ode for carrying out the present invention, even a very minute circuit chip 40 can be accurately and easily fitted into a prescribed position of the O-ring 30. By sandwiching the circuit chip 40 in between the resin sheets 44, the circuit chip 40 becomes easy to handle, and also a function to protect the circuit chip 40 is fulfilled.

Figure 8:
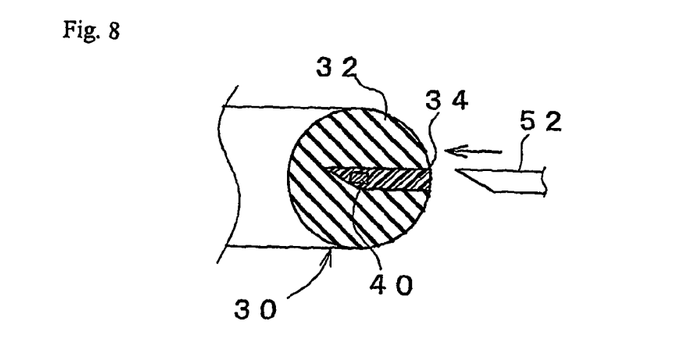
FIG. 8 is a sectional view of an O-ring that illustrates another mode for carrying out the present invention.

<Sticking Tool>:

In the mode shown in FIG. 8 for carrying out the present invention, a sticking tool 52 is used.

The sticking tool 52 of a needle shape with a sharp tip end is stuck into the main body part 32 of the O-ring 30 from the outer periphery side thereof toward the center thereof. It is arranged the sticking tool 52 should be prevented from penetrating to the inner periphery side of the main body part 32. The minute circuit chip 40 is accommodated, in a way of being dropped, into a hole formed in the main body part 32. After that, if, as needed, an adhesive 34 is filled into the hole and then cured to thereby plug up the hole, then the circuit chip 40 comes into a state embedded in the main body part 32. If the adhesive 34 is injected into the hole with a thread-filling nozzle like a syringe needle, then the adhesive 34 can be surely filled without contaminating the periphery with the adhesive. It is also possible that the circuit chip 40 is injected into the hole of the main body part 32 by the filling nozzle together with the adhesive.

Figure 9:
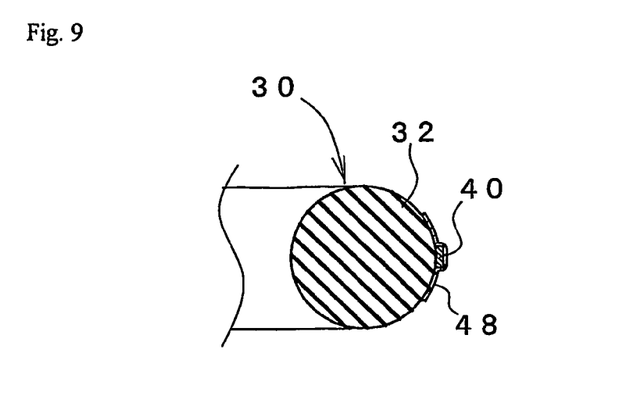
FIG. 9 is a sectional view of an O-ring that illustrates another mode for carrying out the present invention.

<Pasted Structure>:

In the mode shown in FIG. 9 for carrying out the present invention, the circuit chip 40 is attached to the O-ring 30 by pasting.

By using an adhesive tape 48, the circuit chip 40 is pasted to the main body part 32 of the O-ring 30 on the outer periphery side of the main body part 32.

If the circuit chip 40 is provided with a memory circuit to store the information about such as class, production period, and production number of the O-ring 30, then the O-ring 30 can be made to have the managing information. If the circuit chip 40 is provided with a circuit to supply a power source from the outside to the circuit chip 40 or transmit the information to the circuit chip 40 by means of such as induced electromagnetic waves, radiated electromagnetic waves, and infrared rays (though not being provided with the wiring 42), then it is possible to transmit the information to the outside and receive the information from the outside even without the wiring 42. Specifically, the RFID chip or the like capable of transmitting and receiving the information by the infrared rays can be used as the circuit chip 40.

In a state where the O-ring 30 is used in the form fitted to the semiconductor-producing apparatus 10, a reader of the information-processing apparatus 43 can be brought near the outside of the semiconductor-producing apparatus 10 to thereby read the managing information stored in the circuit chip 40. If necessary, it is also possible to write or rewrite the information from the information-processing apparatus 43 into the circuit chip 40.

In the above mode for carrying out the present invention, if the circuit chip 40 and the adhesive tape 48 are separately prepared or they are prepared in the form where the circuit chip 40 has been pasted to the adhesive tape 48 in advance, then a conventional O-ring 30 (e.g. a commercially available product) composed only of the main body part 32 can be easily converted into the O-ring 30 provided with the circuit chip 40. On the scene where the O-ring 30 is used, it is possible to, if necessary, produce the O-ring 30 provided with the circuit chip 40.

Incidentally, in the mode (like the above mode for carrying out the present invention) that the circuit chip 40 is not directly embedded within the O-ring 30, it is difficult to detect the inner stress of the O-ring 30.

Figure 10:
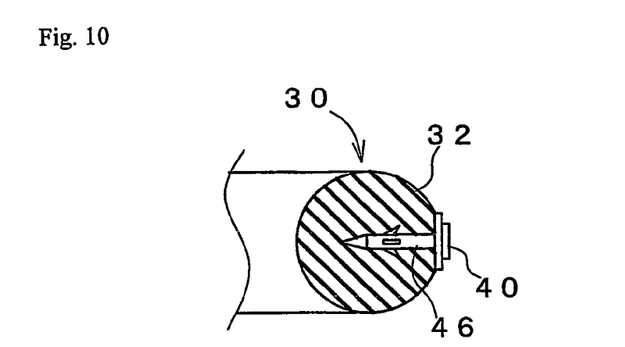
FIG. 10 is a sectional view of an O-ring that illustrates another mode for carrying out the present invention.

<Sticking Pin>:

In the mode shown in FIG. 10 for carrying out the present invention, a sticking pin 46 is used.

The sticking pin 46 in the shape of a push pin has a sharp front end and has a back projections that is sharpened in the direction opposite to the sticking direction on the way of the pin stem. On the pinhead portion, the circuit chip 40 is bonded.

If the sticking pin 46 is stuck into the main body part 32 of the O-ring 30 from the outer periphery side thereof toward the center thereof, then the sticking pin 46 is fixed to the main body part 32. Since the pin stem of the sticking pin 46 has the back projection, the sticking pin 46 is immune against falling off during the use of the O-ring 30.

Similarly to the aforementioned mode of FIG. 9 for carrying out the present invention, the managing information about the O-ring 30 is stored in the circuit chip 40, the information is transmitted to the outside and received from the outside without the wiring 42.

If the circuit chip 40 is minute, then it may be embedded within the pin stem of the sticking pin 46. If this way is carried out, then it is easy to bring the circuit chip 40 near the center of the main body part 32.

In the above mode for carrying out the present invention, if the sticking pin 46 having been provided with the circuit chip 40 in advance is prepared, then a conventional O-ring 30 (e.g. a commercially available product) composed only of the main body part 32 can be easily converted into the O-ring 30 provided with the circuit chip 40.

DETAILED DESCRIPTION OF THE PREFERRED EMBODIMENTS

Descriptions are given below about working examples of some preferred embodiments of the O-ring, provided with the pressure sensor embedded therein, as a sealing ring according to the present invention and about the results of having evaluated the performance of the above O-ring.

[O-Ring]:

As the main body part, there was used a commercially available O-ring product (fluororubber-made FKM (D0270, produced by NIPPON VALQUA INDUSTRIES, LTD.), φ5.33 mm×53ID).

As the circuit chip, there was used a commercially available pressure sensor (PSM compact pressure sensor produced by a KYOWA ELECTRONIC INSTRUMENTS CO., LTD., a distortion gauge type). The pressure sensor gives an electric output corresponding to the distortion quantity generated by the pressure received in a direction crossing at right angles to its surface.

In the way shown in FIG. 5, a cut was formed in the main body part from its outer periphery side along a diameter in a horizontal direction, and then the pressure sensor of a thin plate shape was sandwiched into this cut and thereby fixed. A wiring attached to the pressure sensor was pulled out of the main body part and then connected to a pressure-measuring apparatus (WGA type produced by KYOWA ELECTRONIC INSTRUMENTS CO., LTD.).

[Permeation Leakage Test]:

In a state where the O-ring was fitted to a leakage test apparatus and deformed by 25% by compression, the He leakage quantity was measured with the passage of time. The temperature condition was set at 100° C. At the same time as the measurement of the He leakage quantity, the distortion generated within the O-ring (i.e. inner stress) was measured by the pressure sensor which was embedded in the O-ring. Incidentally, as to the leakage test apparatus, the surface roughness of the sealed members that were placed on opposite sides of the O-ring was 3S.

Figure 11:
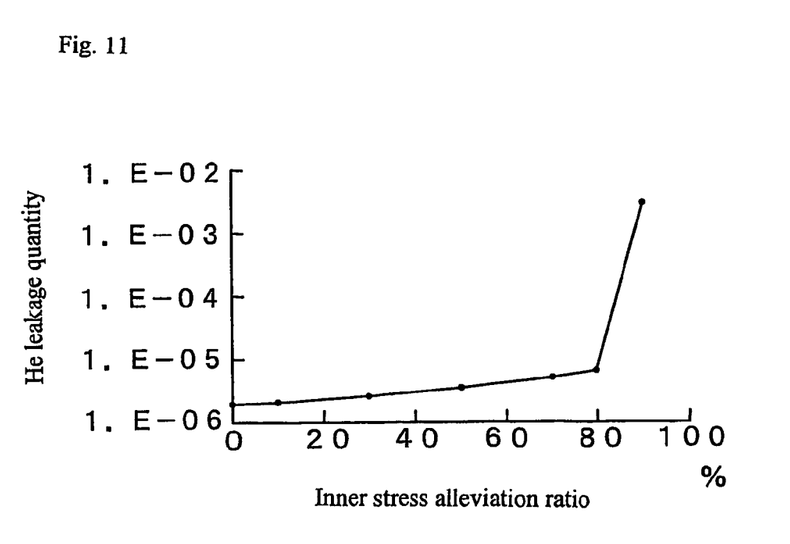
FIG. 11 is a graph showing the results of the leakage test.

The measurement results are shown in FIG. 11. In FIG. 11, the horizontal axis represents the inner stress alleviation ratio (%), and the vertical axis represents the leakage quantity. The inner stress alleviation ratio was calculated by the following equation.

Inner stress alleviation ratio (%)=$[(F_0-F_t)/F_0] \times 100$ $F_0$: inner stress measurement value at the fastening
$F_t$: inner stress measurement value at a passage of t hours
[Evaluation of Test Results]:

According to the test results, it was after about 1,200 hours from the start of the test that the sealing was judged bad from the He leakage quantity. At that point of time, the He leakage quantity had rapidly increased.

On the other hand, the inner stress alleviation ratio also increases gradually with the passage of time. When about 1,200 hours had passed, the inner stress alleviation ratio was 90%. It could be confirmed that: in the stage until the inner stress alleviation ratio reached 80%, the He leakage quantity was small and therefore the sufficient sealing function was fulfilled.

From this result, it can be understood that it will do that: at the stage when the inner stress alleviation ratio has exceeded 80%, the use of the O-ring is judged to be at the limit, and then the O-ring is exchanged. If the O-ring is exchanged at this stage, then there is no fear that the seal leakage from the O-ring occurs.

It has been demonstrated that: if the information detected by the pressure sensor embedded in the O-ring is transmitted to the pressure measurement apparatus (e.g. as set outside the device fitted with the O-ring) and thereby monitored, then it becomes possible to surely and accurately know the exchange timing of the O-ring.

Incidentally, in the aforementioned test, the inner stress alleviation ratio of 80% was judged to be the exchange timing of the O-ring. However, the value of the inner stress alleviation ratio, which is judged to be the exchange timing of the O-ring, is changed depending on such as material, size, structure, and fitting environment of the O-ring. If the value of the inner stress alleviation ratio, when the He leakage quantity exceeds the limit value, is determined by carrying out the same test as the aforementioned one in accordance with actual usage conditions, then the exchange timing of the O-ring can be decided accurately. In addition, depending on such as reliability upon the sealing function demanded under the fitting environment of the O-ring, a value obtained by allowing a prescribed safety ratio for the limit value of the inner stress alleviation ratio determined by the test may be judged to be the exchange timing of the O-ring.

The invention claimed is:

1. A sealing ring, which is a sealing ring to be fitted to a face-to-face part of members to thus seal a space between both members, comprising:
   a main body part that is ring-shaped and is capable of becoming elastically deformed; and
   a circuit chip that is attached unitedly to said main body part and has a information transmitting means for transmitting the information with the outside of said sealing ring;
   wherein said circuit chip has a sensor part for detecting an inner stress of said main body part, and is embedded within said main body part between surfaces of contact of said sealing ring with both members to be sealed by said sealing ring, and information-transmits the state quantity detected by said sensor part to the outside of said sealing ring.

2. The sealing ring according to claim 1, wherein:
said main body part is a molding of an elastic material selected from the group consisting of rubber, resins, and elastomers; and
said sensor part is a pressure sensor.

3. The sealing ring according to claim 1, wherein:
said face-to-face part of members to be fitted with the sealing ring is a face-to-face part of members which constitute a semiconductor-producing device between the inside of a processing chamber of the semiconductor-producing device and the external world; and
said circuit chip embedded in said main body part is not exposed to the inside space of said processing chamber in a state where said sealing ring is fitted to said semiconductor-producing device.

4. The sealing ring according to claim 2, wherein:
said face-to-face part of members to be fitted with the sealing ring is a face-to-face part of members which constitute a semiconductor-producing device between the inside of a processing chamber of the semiconductor-producing device and the external world; and
said circuit chip embedded in said main body part is not exposed to the inside space of said processing chamber in a state where said sealing ring is fitted to said semiconductor-producing device.

5. The sealing ring according to claim 1, wherein:
said circuit chip further has an information storage part for storing the managing information with relation to said sealing ring and an information-transmitting means for information-transmitting the managing information stored in said information storage part to the outside of said sealing ring.

6. The sealing ring according to claim 2, wherein:
said circuit chip further has an information storage part for storing the managing information with relation to said sealing ring and an information-transmitting means for information-transmitting the managing information stored in said information storage part to the outside of said sealing ring.

7. The sealing ring according to claim 3, wherein:
said circuit chip further has an information storage part for storing the managing information with relation to said sealing ring and an information-transmitting means for information-transmitting the managing information stored in said information storage part to the outside of said sealing ring.

8. The sealing ring according to claim 4, wherein:
said circuit chip further has an information storage part for storing the managing information with relation to said sealing ring and an information-transmitting means for information-transmitting the managing information stored in said information storage part to the outside of said sealing ring.

9. The sealing ring according to claim 5, wherein:
said information storage part can rewrite the stored managing information; and
said information-transmitting means can write the managing information from the outside of said sealing ring into said information storage part.

10. The sealing ring according to claim 6, wherein:
said information storage part can rewrite the stored managing information; and said information-transmitting means can write the managing information from the outside of said sealing ring into said information storage part.

11. The sealing ring according to claim 7, wherein:
said information storage part can rewrite the stored managing information; and
said information-transmitting means can write the managing information from the outside of said sealing ring into said information storage part.

12. The sealing ring according to claim 8, wherein:
said information storage part can rewrite the stored managing information; and
said information-transmitting means can write the managing information from the outside of said sealing ring into said information storage part.

13. The sealing ring according to claim 5, wherein:
the managing information to be stored in said information storage part includes the information selected from the group consisting of a production number, a production period, a use period, a model number, a material, and a use place of said sealing ring.

14. The sealing ring according to claim 1, wherein:
said circuit chip further has a radio transmission and reception circuit; and
said information-transmitting means is a radio-information-transmitting means that transmits the information by radio between said circuit chip and an information-processing apparatus that is disposed outside said sealing ring and has a radio transmission and reception circuit.

15. The sealing ring according to claim 13, wherein:
said circuit chip further has a radio transmission and reception circuit; and
said information-transmitting means is a radio-information-transmitting means that transmits the information by radio between said circuit chip and an information-processing apparatus that is disposed outside said sealing ring and has a radio transmission and reception circuit.

16. A sealing-ring-managing system, comprising: the sealing ring as recited in claim 1; and
an information-processing apparatus, which transmits the information via said information-transmitting means with said circuit chip of said sealing ring in a state where said sealing ring is fitted to the face-to-face part of said members, and which carries out the information processing on the basis of the information inputted from said circuit chip and outputs the processed information including the information on said sealing ring selected from the group consisting of a life duration, an exchange timing, a degree of deterioration of a performance, and whether or not there is any occurrence of malfunction.

17. A sealing-ring-managing system, comprising: the sealing ring as recited in claim 13; and
an information-processing apparatus, which transmits the information via said information-transmitting means with said circuit chip of said sealing ring in a state where said sealing ring is fitted to the face-to-face part of said members, and which carries out the information processing on the basis of the information inputted from said circuit chip and outputs the processed information including the information on said sealing ring selected from the group consisting of a life duration, an exchange timing, a degree of deterioration of a performance, and whether or not there is any occurrence of malfunction.

18. A sealing-ring-managing system, comprising: the sealing ring as recited in claim 14; and
an information-processing apparatus, which transmits the information via said information-transmitting means with said circuit chip of said sealing ring in a state where said sealing ring is fitted to the face-to-face part of said members, and which carries out the information processing on the basis of the information inputted from said circuit chip and outputs the processed information including the information on said sealing ring selected from the group consisting of a life duration, an exchange timing, a degree of deterioration of a performance, and whether or not there is any occurrence of malfunction.

19. A sealing-ring-managing system, comprising:
the sealing ring as recited in claim 15; and
an information-processing apparatus, which transmits the information via said information-transmitting means with said circuit chip of said sealing ring in a state where said sealing ring is fitted to the face-to-face part of said members, and which carries out the information processing on the basis of the information inputted from said circuit chip and outputs the processed information including the information on said sealing ring selected from the group consisting of a life duration, an exchange timing, a degree of deterioration of a performance, and whether or not there is any occurrence of malfunction.

* * * * *